United States Patent
Chung et al.

(10) Patent No.: US 9,423,643 B2
(45) Date of Patent: Aug. 23, 2016

(54) DISPLAY PANEL PREVENTING REFLECTION OF EXTERNAL LIGHT AND DISPLAY APPARATUS HAVING THE SAME

(71) Applicant: SAMSUNG ELECTRONICS CO., LTD., Suwon-si (KR)

(72) Inventors: Seong-eun Chung, Seoul (KR); Il-yong Jung, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 75 days.

(21) Appl. No.: 14/341,273

(22) Filed: Jul. 25, 2014

(65) Prior Publication Data

US 2015/0029438 A1    Jan. 29, 2015

(30) Foreign Application Priority Data

Jul. 25, 2013    (KR) .......................... 10-2013-0088127

(51) Int. Cl.
*G02F 1/1335*    (2006.01)

(52) U.S. Cl.
CPC .... *G02F 1/133502* (2013.01); *G02F 1/133512* (2013.01); *G02F 2001/133548* (2013.01)

(58) Field of Classification Search
CPC .............. G02F 1/133615; G02F 2001/133607; G02F 1/133603; G02F 1/133604; G02F 1/133606; G02F 1/133528; G02F 1/133536; G02F 1/133363; G02B 6/0053; G02B 6/0038; G02B 5/3033; G02B 5/3016
USPC .................................. 349/62, 61, 96
See application file for complete search history.

(56) References Cited

U.S. PATENT DOCUMENTS

| | | | |
|---|---|---|---|
| 8,587,751 B2 * | 11/2013 | Kim | .................. G02F 1/133516 349/106 |
| 2004/0218123 A1 | 11/2004 | Park et al. | |

(Continued)

FOREIGN PATENT DOCUMENTS

| | | |
|---|---|---|
| EP | 2 555 044 A1 | 2/2013 |
| KR | 10-1073328 B1 | 10/2011 |

(Continued)

OTHER PUBLICATIONS

Search Report dated Oct. 2, 2014 issued by the International Searching Authority in counterpart International Patent Application No. PCT/KR2014/004787 (PCT/ISA/210).

(Continued)

*Primary Examiner* — Mike Qi
(74) *Attorney, Agent, or Firm* — Sughrue Mion, PLLC

(57) ABSTRACT

A liquid crystal display (LCD) panel is provided, including a lower substrate; an upper substrate disposed to face the lower substrate; a liquid crystal layer disposed between the upper substrate and the lower substrate; a lower polarizing layer with a structure of wire grid formed on one surface of the lower substrate and configured to provide polarizing-filtering of light radiated from a backlight; and an upper polarizing layer with a structure of wire grid formed on one surface of the upper substrate and configured to provide polarizing-filtering of the radiated light passing through the lower polarizing layer and the liquid crystal layer, at least one of the wire grid of the lower polarizing layer and the wire grid of the upper polarizing layer including a reflection layer configured to reflect the radiated light and an absorbing layer configured to absorb external light incident from the outside through the upper substrate.

15 Claims, 7 Drawing Sheets

(56) References Cited

U.S. PATENT DOCUMENTS

| | | |
|---|---|---|
| 2006/0118514 A1 | 6/2006 | Little et al. |
| 2006/0127816 A1 | 6/2006 | Kang et al. |
| 2007/0242352 A1* | 10/2007 | MacMaster .......... G02B 5/3058 359/485.05 |
| 2008/0037094 A1* | 2/2008 | Hwang ................ G02B 5/3058 359/238 |
| 2008/0100781 A1* | 5/2008 | Choo ................ G02F 1/133536 349/96 |
| 2008/0309845 A1 | 12/2008 | Tsujimura et al. |
| 2009/0273728 A1 | 11/2009 | Song et al. |
| 2012/0206676 A1 | 8/2012 | Chung et al. |
| 2013/0033659 A1 | 2/2013 | Chung et al. |
| 2013/0033662 A1 | 2/2013 | Chung et al. |
| 2013/0270223 A1 | 10/2013 | Lee et al. |
| 2014/0160396 A1* | 6/2014 | Chung ............. G02F 1/133502 349/62 |
| 2015/0029438 A1 | 1/2015 | Chung et al. |

FOREIGN PATENT DOCUMENTS

| | | |
|---|---|---|
| KR | 10-2013-0015470 A | 2/2013 |
| KR | 10-2013-0015471 A | 2/2013 |

OTHER PUBLICATIONS

Communication issued Apr. 13, 2016, issued by the United States Patent and Trademark Office in counterpart U.S. Appl. No. 14/738,320.

* cited by examiner

DISPLAY PANEL PREVENTING REFLECTION OF EXTERNAL LIGHT AND DISPLAY APPARATUS HAVING THE SAME

CROSS-REFERENCE TO RELATED APPLICATION

This application claims priority from Korean Patent Application No. 10-2013-0088127, filed on Jul. 25, 2012 in the Korean Intellectual Property Office, the disclosure of which is incorporated herein by reference, in its entirety.

BACKGROUND

1. Technical Field

Apparatuses and methods consistent with the exemplary embodiments relate to a display panel displaying an image, and to a display apparatus having the same. More particularly, the exemplary embodiments relate to a display panel having an improved structure of polarizing-filtering light and preventing reflection of external light, as a liquid crystal display panel displaying an image by light provided from a backlight, and a display apparatus having the same.

2. Description of the Related Art

A display apparatus is a device which includes a display panel which displays images to present broadcast signals or various formats of image signals or image data. The display panel is configured as various types, such as a liquid crystal display (LCD) panel, a plasma display panel (PDP), or the like, and is employed for a variety of display apparatuses. When an LCD panel that does not generate light by itself is adopted, a display apparatus includes a backlight which generates and provides light to the display panel.

An LCD panel includes a polarizing film for polarizing-filtering light radiated from a backlight and a color filter layer which converts the radiated light into RGB colors of light. However, the polarizing film and the color filter layer have a high reflectance/absorption rate with respect to the radiated light, thereby reducing light efficiency throughout the panel. In particular, the color filter layer includes RGB dye layers, each of which only transmits light in a necessary wavelength range and reflects or absorbs light in other wavelength ranges, which results in a serious decrease in light efficiency.

To minimize a decrease in light efficiency, a display panel of the related art includes a dual brightness enhance film (DBEF), manufactured by crossing polymer films into a multilayer, stacked on a light entering surface. However, the DBEF involves a complicated manufacture process and high production costs, which contributes to an increase in price of the display apparatus.

Meanwhile, there are various disturbing factors which occur when a user perceives images displayed on the foregoing structured display apparatus. For example, a glare phenomenon, which is light shining on a surface of a display panel displaying an image by reflection of external light from surroundings. Glare becomes serious with higher intensity of external light, and may even make users hardly perceive images displayed on the panel. Although dark surroundings are favorable to minimize a glare phenomenon, it is hard to exclude external light in an actual environment for use of the display apparatus. Thus, a method or structure of reducing intensity of external light reflected on the surface of a display panel is crucial for a display panel and a display apparatus having the same, in view of how clearly the display panel and the display apparatus display images.

SUMMARY

The foregoing and/or other aspects may be achieved by providing a liquid crystal display (LCD) panel including: a lower substrate; an upper substrate disposed to face the lower substrate; a liquid crystal layer disposed between the upper substrate and the lower substrate; a lower polarizing layer with a structure of wire grid formed on one surface of the lower substrate, and polarizing-filtering light radiated from a backlight; and an upper polarizing layer with a structure of wire grid formed on one surface of the upper substrate and polarizing-filtering the radiated light passing through the lower polarizing layer and the liquid crystal layer, wherein at least one of the wire grid of the lower polarizing layer and the wire grid of the upper polarizing layer includes a reflection layer to reflect the radiated light and an absorbing layer configured to absorb external light incident from the outside through the upper substrate.

In response to the radiated light entering a lower side of the lower substrate and the external light entering an upper side of the upper substrate, the absorbing layer may be disposed on the reflection layer.

The reflection layer may be disposed in a direction in which the radiated light enters the display panel and the absorbing layer is disposed in a direction in which the external light enters the display panel in the wire grids of the lower polarizing layer and the upper polarizing layer.

The reflection layer and the absorbing layer may be metal layers which include metal materials.

The reflection layer may have a higher light reflectance and a lower absorption rate than the absorbing layer.

The reflection layer may include an Al material.

The absorbing layer may include a MoW material.

The foregoing and/or other aspects of the exemplary embodiments may be achieved by providing a display apparatus including: a liquid crystal display (LCD) panel; and a backlight providing light to the LCD panel so that an image is displayed on the LCD panel, the LCD panel including: a lower substrate; an upper substrate disposed to face the lower substrate; a liquid crystal layer disposed between the upper substrate and the lower substrate; a lower polarizing layer with a structure of wire grid formed on one surface of the lower substrate and polarizing-filtering light radiated from the backlight; and an upper polarizing layer with a structure of wire grid formed on one surface of the upper substrate and polarizing-filtering the radiated light passing through the lower polarizing layer and the liquid crystal layer, wherein at least one of the wire grid of the lower polarizing layer and the wire grid of the upper polarizing layer includes a reflection layer configured to reflect the radiated light and an absorbing layer configured to absorb external light incident from the outside through the upper substrate.

When the radiated light enters a lower side of the lower substrate and the external light enters an upper side of the upper substrate, the absorbing layer is disposed on the reflection layer.

The reflection layer may be disposed in a direction in which the radiated light enters the display panel and the absorbing layer is disposed in a direction in which the external light enters the display panel in the wire grids of the lower polarizing layer and the upper polarizing layer.

The reflection layer and the absorbing layer may be metal layers which include metal materials.

The reflection layer may have a higher light reflectance and a lower absorption rate than the absorbing layer.

The reflection layer may include an Al material.

The absorbing layer may include a MoW material.

An aspect of an exemplary embodiment may provide a liquid crystal display (LCD) panel including: a liquid crystal layer; a lower polarizing layer with a structure of wire grid and configured to provide polarizing-filtering of light radiated from a backlight; and an upper polarizing layer with a structure of wire grid and configured to provide polarizing-filtering of the radiated light passing through the lower polarizing layer and the liquid crystal layer.

At least one of the wire grid of the lower polarizing layer and the wire grid of the upper polarizing layer may include a reflection layer configured to reflect the radiated light and an absorbing layer configured to absorb external light incident from outside the LCD panel.

The liquid crystal panel may further include: a lower substrate; and an upper substrate disposed to face the lower substrate.

The liquid crystal panel may be disposed between the upper substrate and the lower substrate; and the lower polarizing layer is formed on one surface of the lower substrate.

The upper polarizing layer may be formed on one surface of the upper substrate.

In response to the radiated light entering a lower side of the lower substrate and the external light entering an upper side of the upper substrate, the absorbing layer may be disposed on the reflection layer.

In addition, the reflection layer may be disposed in a direction in which the radiated light enters the display panel and the absorbing layer is disposed in a direction in which the external light enters the display panel in the wire grids of the lower polarizing layer and the upper polarizing layer.

BRIEF DESCRIPTION OF THE DRAWINGS

The above and/or other aspects will become apparent and more readily appreciated from the following description of the exemplary embodiments, taken in conjunction with the accompanying drawings, in which.

DETAILED DESCRIPTION OF THE EXEMPLARY EMBODIMENTS

Figure 1:
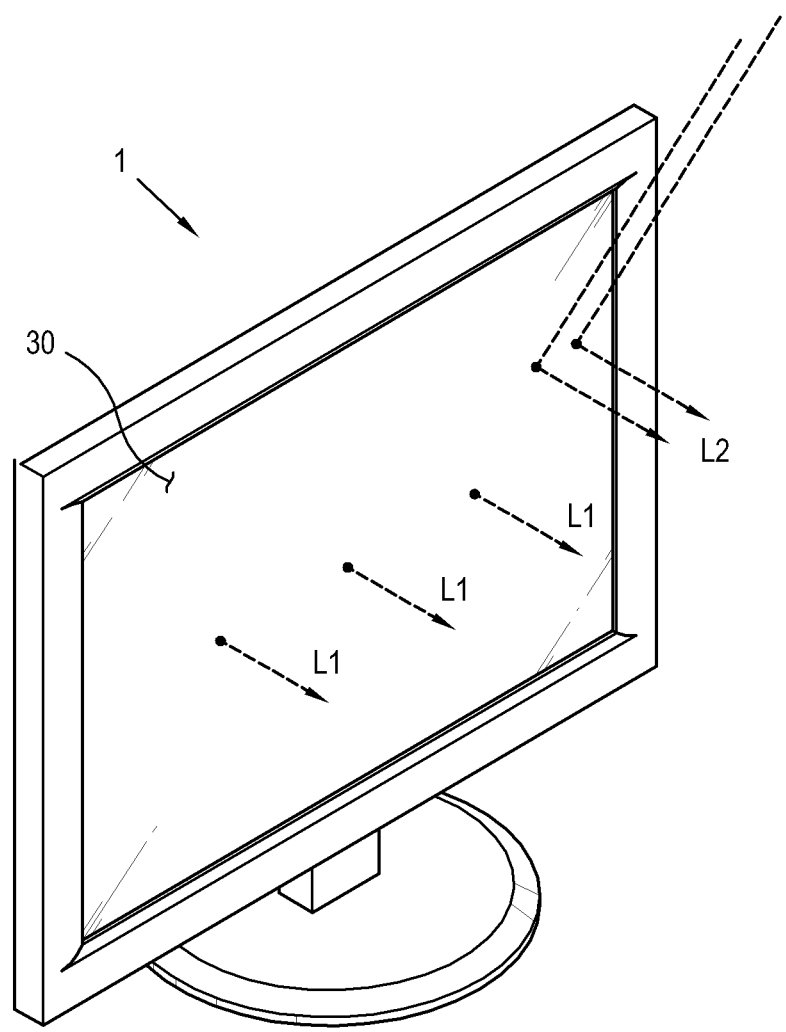
FIG. 1 illustrates a display apparatus according to a first exemplary embodiment.

Below, exemplary embodiments will be described in detail with reference to the accompanying drawings so as to be easily understood by a person having ordinary knowledge in the art. The exemplary embodiments may be embodied in various forms without being limited to the exemplary embodiments set forth herein. Descriptions of well-known parts are omitted for clarity and conciseness, and like reference numerals refer to like elements throughout.

FIG. 1 illustrates a display apparatus according to a first exemplary embodiment.

As shown in FIG. 1, the display apparatus 1 is a device which is capable of processing an externally received image signal and autonomously displaying an image based on the processed image signal. In an exemplary embodiment, a TV is illustrated as an example of the display apparatus 1. However, the display apparatus 1 may be provided as various types, for example, a TV, a monitor, a portable multimedia player and a mobile phone, as long as the display apparatus 1 includes a display panel 30 to display an image.

The display panel 30 autonomously generates light for displaying an image or is provided with such light from another component. For example, a self-luminous display panel, such as an organic light emitting diode (OLED) panel, generates light by itself to display an image, whereas a non-self-luminous display panel 30, such as a liquid crystal display (LCD) panel, in an exemplary embodiment does not generate light by itself but rather is provided with light generated from a backlight (not shown).

The display panel 30 emits light L1 radiated from the backlight to the outside across a surface thereof, so that a user perceives an image displayed on the surface.

However, while the image is being displayed on the display panel 30, external light L2 from an external environment in which the display apparatus 1 is used reaches an outermost surface. In response to the external light L2 neither being absorbed nor extinguished on the display panel 30, the external light L2 is reflected on the display panel 30, so that the user may have difficulty in perceiving the image displayed on the display panel 30.

Hereinafter, a structure of the display apparatus 1 will be described with reference to FIG. 2.

Figure 2:
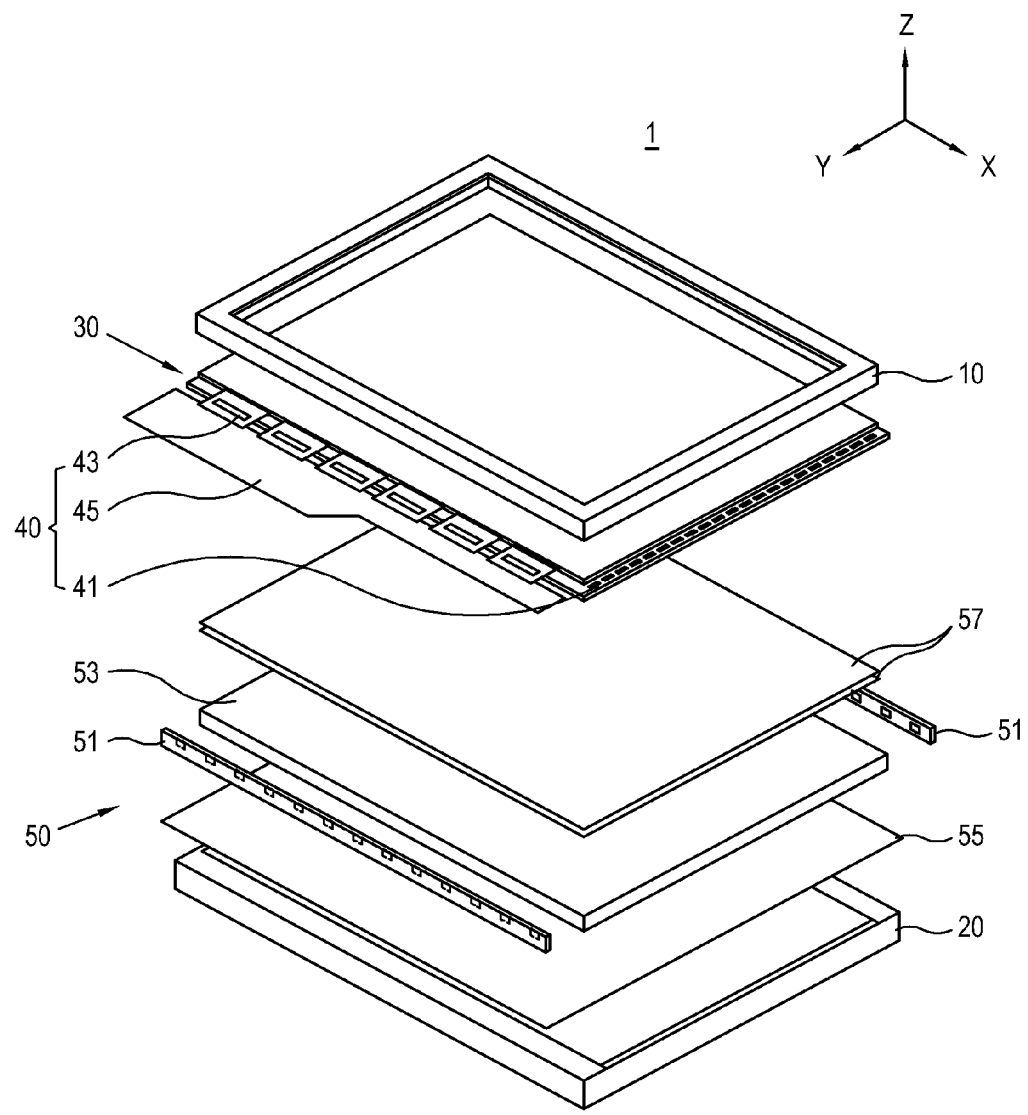
FIG. 2 is an exploded perspective view which illustrates the display apparatus of FIG. 1.

FIG. 2 is an exploded perspective view which illustrates the display apparatus 1. An exemplary embodiment will be illustrated with the display apparatus 1 including an LCD panel 30.

Referring to FIG. 2, the display apparatus 1 includes covers 10 and 20 forming an interior space, a display panel 30 situated in the interior space by the covers 10 and 20 and displaying images on an upper surface thereof, a panel driver 40 driving the display panel 30, and a backlight 50 situated in the interior space by the covers 10 and 20 to face a lower surface of the display panel 30 and providing light to the display panel 30.

Directions shown in FIG. 2 are defined as follows. Basically, X, Y, and Z directions of FIG. 2 indicate width, length, and height directions of the display panel 30, respectively. The display panel 30 is disposed on an X-Y plane defined by an X-axis and a Y-axis, and the covers 10 and 20, the display panel 30 and the backlight 50 are stacked on a Z-axis. Opposite X, Y, and Z directions are expressed as −X, −Y, and −Z directions, respectively.

Further, unless specified otherwise, expressions "upper" or "above" means the Z direction, while "lower" or "under" means the −Z direction. For example, the backlight 50 is disposed under the display panel 30, and light radiated from the backlight 50 enters the lower surface of the display panel 30 and exits from the upper surface of the display panel 30.

The covers 10 and 20 form an outward shape of the display apparatus 1 and support the display panel 30 and the backlight 50 which are situated inside. Defining the Z direction as a front direction or front side and the −Z direction as a rear direction or rear side based on the display panel 30 in FIG. 2, the covers 10 and 20 include a front cover 10 supporting a front side of the display panel 30 and a rear cover 20 supporting a rear side of the backlight 50. The front cover 10 has an opening formed on a surface thereof parallel with the X-Y plane to expose an image display area of the display panel 30 externally.

The display panel 30 is configured as an LCD panel. The display panel 30 is formed of two substrates (not shown) and a liquid crystal layer (not shown) interposed there between and displays images on a surface thereof by adjusting an arrangement of liquid crystals in the liquid crystal layer (not shown) through application of driving signals. The display panel 30 does not emit light by itself and thus is provided with light from the backlight 50 to display images in the image display area on the surface thereof.

The panel driver 40 applies a driving signal for driving the liquid crystal layer to the display panel 30. The panel driver 40 includes a gate drive integrated circuit (IC) 41, a data chip film package 43, and a printed circuit board (PCB) 45.

The gate drive IC 41 is integratedly formed on a substrate (not shown) of the display panel 30 and is connected to each gate line (not shown) on the display panel 30. The data chip film package 43 is connected to each data line (not shown) formed on the display panel 30. Here, the data chip film package 43 may include a wiring pattern, obtained by forming semiconductor chips on a base film, and a tape automated bonding (TAB) tape bonded by a TAB technique. The chip film package may include, for example, a tape carrier package (TCP) or a chip on film (COF). Meanwhile, the PCB 45 inputs a gate drive signal to the gate drive IC 41 and inputs a data drive signal to the data chip film package 43.

With this configuration, the panel driver 40 inputs drive signals to each gate line and each data line on the display panel 30, respectively, thereby driving the liquid crystal layer (not shown) by a pixel unit.

The backlight 50 may be disposed under the display panel 30, that is, in the −Z direction of the display panel 30, to provide light to the lower surface of the display panel 30. The backlight 50 includes a light source unit 51 disposed on an edge of the display panel 30, a light guide plate 53 disposed parallel with the display panel 30 to face the lower surface of the display panel 30, a reflection plate 55 disposed under the light guide plate 53 to face a lower surface of the light guide plate 53, and at least one optical sheet 57 disposed between the display panel 30 and the light guide plate 53.

In an exemplary embodiment, an edge-type backlight 50 is illustrated in which the light source 51 is disposed at a lateral side of the light guide plate 53 and a light emitting direction of the light source 51 and a light exiting direction of the light guide plate 53 are perpendicular to each other. However, a structure of the backlight 50 may be variously changed or modified in design, without being limited to an exemplary embodiment. For example, a direct-type backlight 50 may be used in which the light source 51 is disposed under the light guide plate 53 and the light emitting direction of the light source 51 and the light exiting direction of the light guide plate 53 are parallel to each other.

The light source 51 generates light and radiates the generated light to enter the light guide plate 53. The light source 51 is installed perpendicular to the surface of the display panel 30; that is, the X-Y plane, and disposed along at least one of four edges of the display panel 30 or the light guide plate 53. The light source 51 include light emitting elements (not shown), for example, light emitting diodes (LEDs), sequentially disposed on a module substrate (not shown) in the X direction.

The light guide plate 53, which is a plastic lens including injection molded acrylic materials, uniformly guides light incident from the light source 51 to the entire image display area of the display panel 30. The lower surface of the light guide plate 53 that is a side in the −Z direction faces the reflection plate 55. Further, among four side walls formed between an upper surface and the lower surface of the light guide plate 53 in four directions, side walls in the Y and −Y directions face the light source 51. Light radiated from the light source 51 enters the side walls in the Y and −Y directions.

The light guide plate 53 includes various optical patterns (not shown) formed on the lower surface to diffused-reflect light proceeding in the light guide plate 53 or change a traveling direction of the light, thereby uniformly distributing light exiting from the light guide plate 53.

The reflection plate 55 under the light guide plate 53 reflects light exiting from an inside of the light guide plate 53 to the outside to head back toward the light guide plate 53. The reflection plate 55 reflects light not reflected by the optical patterns formed on the lower surface of the light guide plate 53 back into the light guide plate 53. To this end, an upper surface of the reflection plate 55 has characteristics of total reflection.

The at least one optical sheet 57 is stacked above the light guide plate 53 to adjust characteristics of light exiting from the light guide plate 53. The optical sheet 57 may include a diffusion sheet, a prism sheet, or a protection sheet, wherein two or more kinds of sheets may be stacked in combination for ultimately desired light characteristics.

Figure 3:
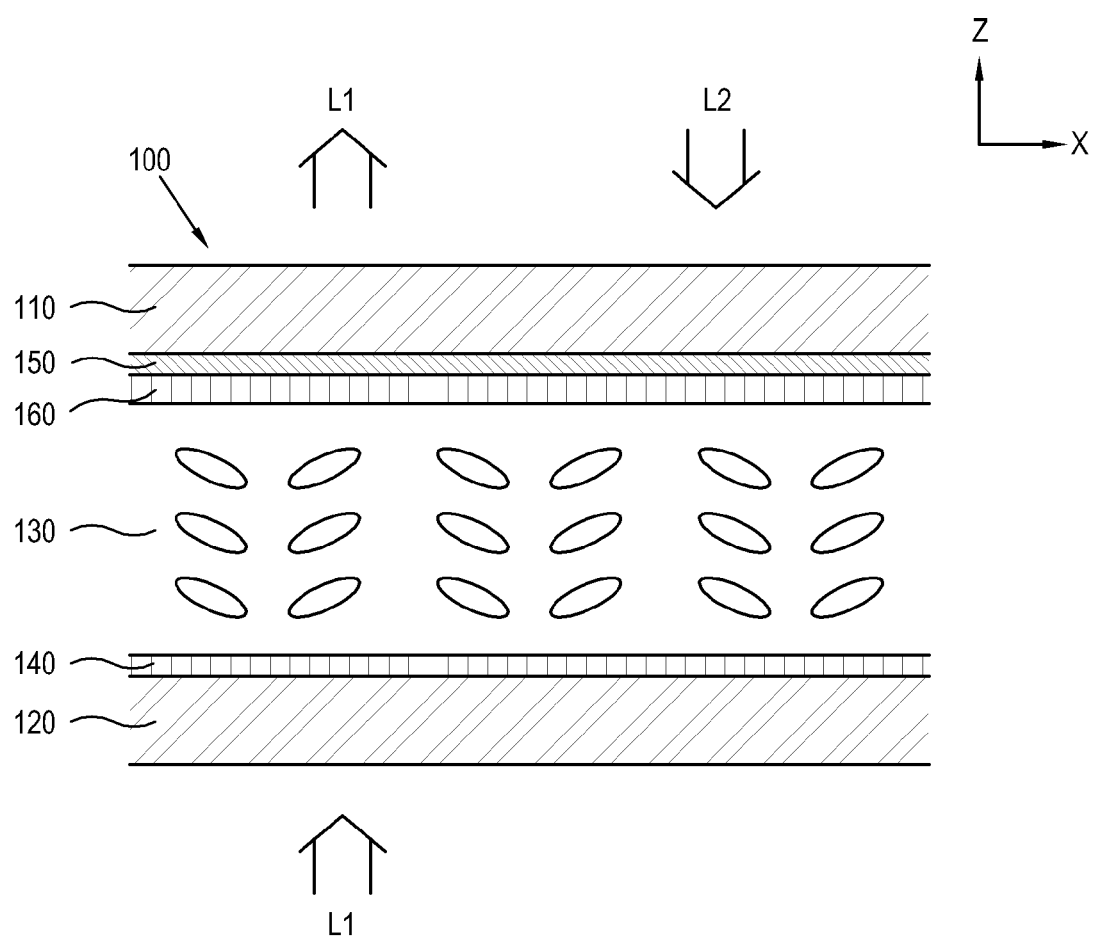
FIG. 3 is a cross-sectional view which illustrates a layered structure of elements of a display panel used for the display apparatus of FIG. 1.

FIG. 3 is a cross-sectional view which illustrates a layered structure of elements of a display panel 100. The display panel 100 of FIG. 3 has a configuration substantially the same as the display panel 30 illustrated in FIGS. 1 and 2 and thus may be applied to the display apparatus 1 of FIG. 1.

As shown in FIG. 3, light L1 radiated in the Z direction from the backlight unit 50 (see FIG. 2) enters the display panel 100 and exits in the Z direction via different elements of the display panel 100. In the following description, spatially relative terms, such as "upper," "above," "lower" and "under" may be used herein for ease of description to describe the relationship of one element or feature to another element(s) or feature(s) in arrangement or deposition based on the Z direction in which the light L1 proceeds.

The display panel 100 includes an upper substrate 110, a lower substrate 120 disposed to face the upper substrate 110, a liquid crystal layer 130 disposed between the upper substrate 110 and the lower substrate 120, a lower polarizing layer 140 disposed between the liquid crystal layer 130 and the lower substrate 120, an upper polarizing layer 150 disposed between the liquid crystal layer 130 and the upper substrate 110, and a color filter layer 160 disposed between the liquid crystal layer 130 and the upper polarizing layer 150.

Hereinafter, the elements of the display panel 100 will be described in detail.

The upper substrate 110 and the lower substrate 120 are transparent substrates disposed to face each other at a predetermined interval in the light proceeding direction. As for materials, the upper substrate 110 and the lower substrate 120 may be formed of a glass or plastic substrate. As a plastic substrate, the upper substrate 110 and the lower substrate 120 may include polycarbonate, polyimide (PI), polyethersulphone (PES), polyacrylate (PAR), polyethylenenaphthelate (PEN) or polyethyleneterephehalate (PET).

The upper substrate 110 and the lower substrate 120 have different characteristics based on a drive method of the liquid crystal layer 130. For example, in a passive-matrix liquid crystal layer 130, the upper substrate 110 and the lower substrate 120 may include soda lime glass. In an active-matrix liquid crystal layer 130, the upper substrate 110 and the lower substrate 120 may include alkali free glass or borosilicate glass.

The liquid crystal layer 130 is disposed between the upper substrate 110 and the lower substrate 120 and adjusts light transmittance with a change in arrangement of the liquid crystals based on an applied driving signal. A liquid generally includes molecules with irregular orientation and arrangement, while liquid crystals are matter in a state with regularity to a certain extent, similar to a liquid phase. For example, there is a solid which becomes in a liquid phase exhibiting anisotropic properties such as birefringence when heated and melted. Liquid crystals have optical properties such as birefringence or color change. A liquid crystal is named such because the liquid crystal has properties of both liquid and solid crystal, for example, regularity as a crystal-like property and a liquid-like phase. When voltage is applied to the liquid crystals, an arrangement of the molecules is changed and optical properties thereof are also changed accordingly.

The liquid crystals in the liquid crystal layer 130 may be classified into nematic, cholesteric, smectice and ferroelectric liquid crystals based on an arrangement of the molecules.

The lower polarizing layer 140 is formed on a surface of the lower substrate 120 in the Z direction that is a light L1 exiting surface of the lower substrate 120. The lower polarizing layer 140 transmits only a preset first polarizing-direction component of the radiated light L1 and reflects components other than the first polarizing-direction component.

The upper polarizing layer 150 is formed on a surface of the upper substrate 120 in the −Z direction that is a light L1 entering surface of the upper substrate 110. The upper polarizing layer 150 transmits only a preset second polarizing-direction component of the radiated light L1 passing through the lower substrate 120, the lower polarizing layer 140, and the liquid crystal layer 130 and reflects other component than the second polarizing-direction component.

A second polarizing direction is different from a first polarizing direction, particularly perpendicular to the first polarizing direction, for which a polarizing direction of the radiated light L1 is rotated 90 degrees by the liquid crystal layer 130 when the radiated light L1 passes through the liquid crystal layer 130. In response to the upper polarizing layer 150 transmitting the first polarizing-direction component in the same way as the lower polarizing layer 140, the radiated light in the first polarizing direction via the lower polarizing layer 140 is adjusted to the second polarizing direction when passing through the liquid crystal layer 130, and thus does not pass through the upper polarizing layer 150. In this regard, a polarizing direction of light transmitted by the upper polarizing layer 150 is perpendicular to that of light transmitted by the lower polarizing layer 140.

The upper polarizing layer 150 and the lower polarizing layer 140 are provided as wire grids or wire grids (not shown) of a plurality of bars extending in one direction parallel with the X-Y plane respectively on the surfaces of the upper substrate 110 and the lower substrate 120. The bars of the wire grid are arranged at a preset pitch and extend in a direction which corresponds to each polarizing direction. The wire grid on the upper polarizing layer 150 projects from the upper substrate 110 to the liquid crystal layer 130, while the wire grid on the lower polarizing layer 140 projects from the lower substrate 120 to the liquid crystal layer 130.

However, external light L2 enters the display panel 100 from the outside in an opposite direction to the direction of the radiated light L1 for displaying an image on the display panel 100. When the external light L2 is reflected on the display panel 100, a user may be disturbed in perceiving an image displayed on the display panel 100. Thus, a structure of suppressing reflection of the external light L2 is needed.

According to the related art, an antiglare film or an antireflection film is stacked on a top layer of the display panel 100, that is, a surface of the upper substrate 110 in the Z direction, to suppress reflection of the external light L2.

The antiglare film has such a structure that the external light L2 is reflected in a random direction on a surface thereof to scatter the external light L2, thereby suppressing transmission of light reflected on the display panel 100 to the eyes of a user. The antiglare film has a specular reflectance of 2.0 to 2.5% and is applied to a large-screen display panel. Meanwhile, the antireflection film is formed by depositing a plurality of materials having different refractive indices into a multilayer, thereby extinguishing reflection of the external light L2 on interfaces between the respective coating layers due to a change in refractive index. As such, the antireflection film extinguishes the external light L2, showing an excellent specular reflectance of 0.1 to 1.0%. However, it is not easy to apply the antireflection film to a large-screen display panel due to cost efficiency and difficulties in manufacture.

Thus, the display panel 100 according to an exemplary embodiment adopts a structure illustrated as follows.

The lower polarizing layer 140 and the upper polarizing layer 150 of the display panel 100 have the wire grids to polarize-filter the radiated light L1, wherein at least one of the wire grids of the lower polarizing layer 140 and the upper polarizing layer 150 includes a reflection layer to reflect the radiated light L1 and an absorbing layer to absorb the external light L2. In the wire grids of the lower polarizing layer 140 and the upper polarizing layer 150, the reflection layer is disposed in a direction in which the radiated light L1 enters the display panel 100 and the absorbing layer is disposed in a direction in which the external light L2 enters the display panel 100.

Hereinafter, a structure of the lower polarizing layer 140 will be described with reference to FIG. 4. The same structure may be applied to the upper polarizing layer 150.

Figure 4:
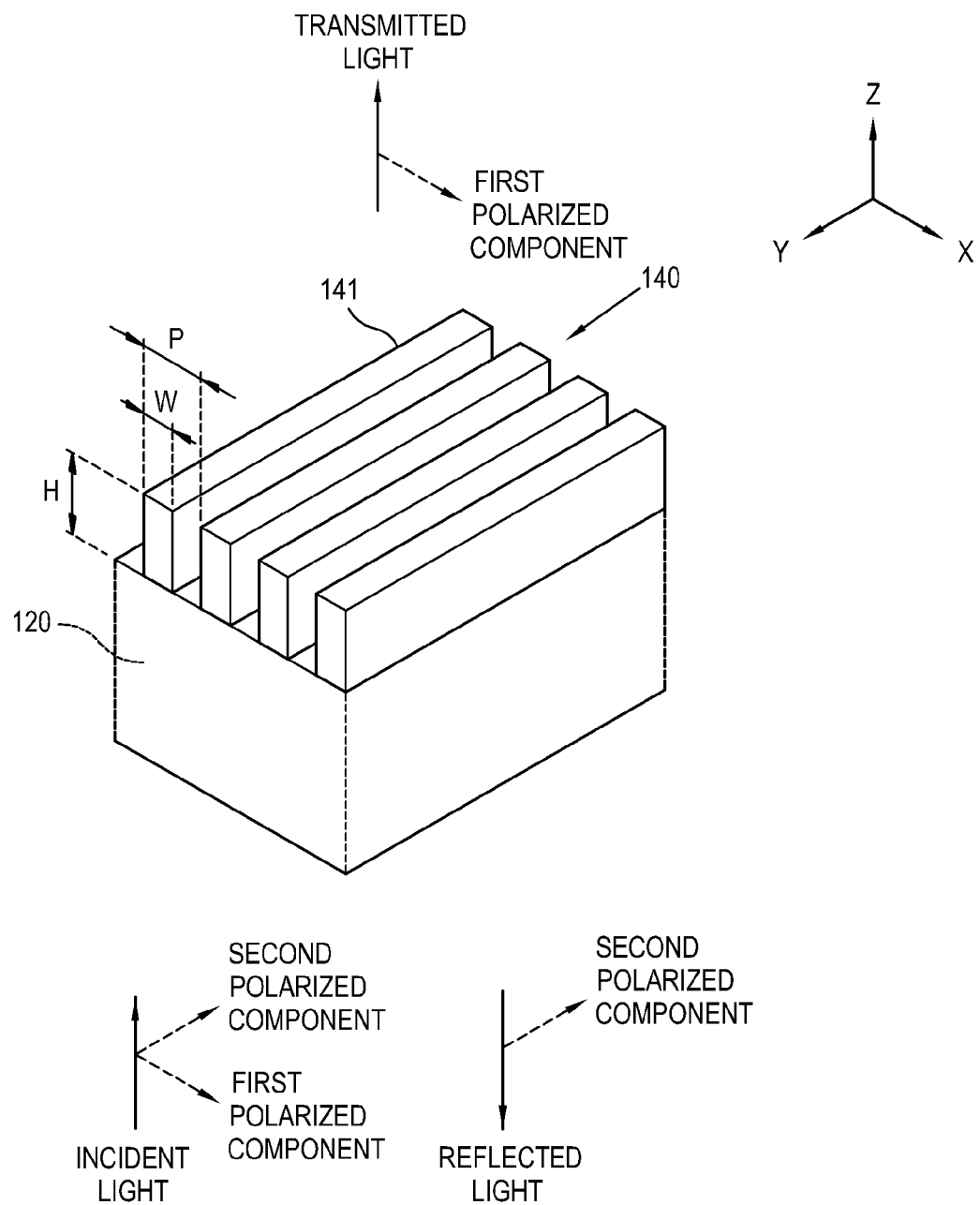
FIG. 4 is a perspective view which illustrates a main part of a lower polarizing layer of the display panel of FIG. 3.

FIG. 4 is a perspective view which illustrates a main part of the lower polarizing layer 140.

As shown in FIG. 4, the lower polarizing layer 140 includes a wire grid or a linear grid formed by disposing a plurality of bars 141 parallel with each other on the lower substrate 120, the bars 141 projecting in the Z direction and extending in the Y direction. The bars 141 have a preset height H and width W and are arranged regularly at a preset pitch P.

In response to the pitch P of the wire grid being adjusted to ½ of a wavelength of light, only transmitted light and reflected light are formed without diffracted waves. A slit is formed between two adjacent bars 141 of the wire grid, and while incident light is passing through the slit, a first polarized component in the first polarizing direction perpendicular to the extending direction of the bars 141 passes through the lower polarizing layer 140. To the contrary, a second polarized component in the second polarizing direction parallel with the extending direction of the bars 141 is reflected in the −Z direction, not passing through the lower polarizing layer 140. That is, due to the wire grid, light passing through the lower polarizing layer 140 is polarized-filtered in the first polarizing direction.

The reflected light, which does not pass through the lower polarizing layer 140, is reflected by the reflection plate 55 (FIG. 2) back to the display panel 100 along with light generated in the light source 51 (FIG. 2). That is, the light which does not pass but is filtered by the lower polarizing layer 140 may be reused, thereby improving overall efficiency of light passing through the display panel 100 without use of a DBEF film of the related art.

The lower polarizing layer 140 is formed by depositing a metal layer on the lower substrate 120 and patterning the bars 141 by nanoimprint lithography (NIL). Accordingly, in response to a polarizing direction of entering light being parallel to the bars, the light is reflected by the lower polarizing layer 140. In response to the polarizing direction of entering light being perpendicular to the bars, the light is transmitted.

To improve polarizing-filtering properties of the lower polarizing layer 140, an aspect ratio, i.e., a ratio of the width W of the bars 141 to the height H thereof, may be 1:3 or higher.

Meanwhile, the upper polarizing layer 150 has a wire grid structure similar to that of the lower polarizing layer 140. Here, a wire grid (not shown) of the upper polarizing layer 150 extends perpendicular to the wire grid 141 of the lower polarizing layer 140. For example, when the wire grid 141 of the lower polarizing layer 140 extends in the Y direction, the wire grid of the upper polarizing layer 150 extends in the X direction, perpendicular to the Y direction. Accordingly, the upper polarizing layer 150 transmits the second polarized component only and does not transmit the first polarized component.

Figure 5:
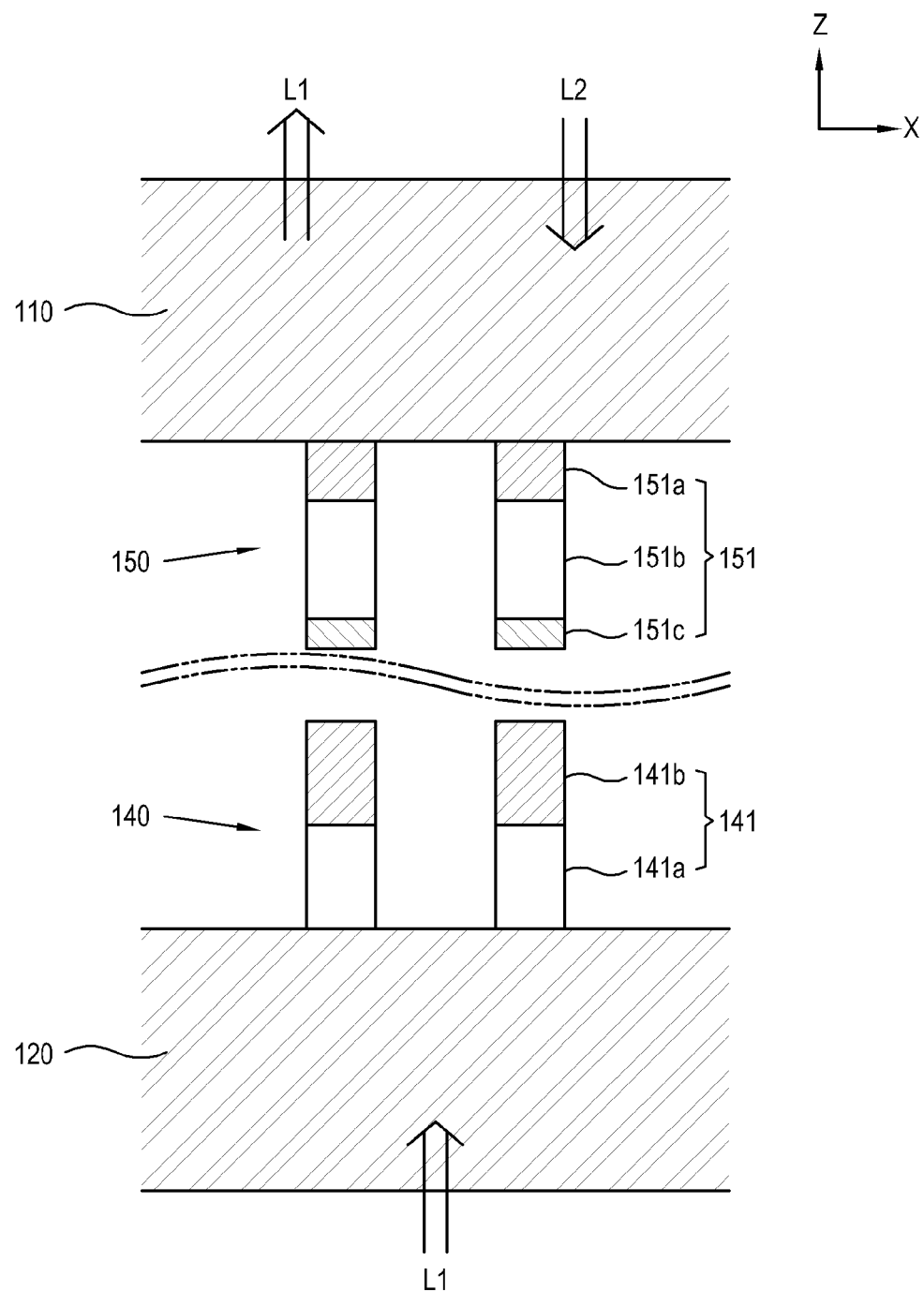
FIG. 5 is a lateral cross-sectional view which illustrates a layered configuration of the lower polarizing layer and an upper polarizing layer of the display panel of FIG. 3.

FIG. 5 is a lateral cross-sectional view which illustrates a layered configuration of the lower polarizing layer 140 and the upper polarizing layer 150.

As shown in FIG. 5, the radiated light L1 proceeding in the Z direction enters the lower surface of the lower substrate 120 and exits from an upper surface of the upper substrate 110, while the external light L2 incident in the −Z direction enters the upper surface of the upper substrate 110.

The bars 141 forming the lower polarizing layer 140 project to the upper substrate 110 in the Z direction. Each bar 141 of the lower polarizing layer 140 includes a reflection layer 141a disposed on an upper surface of the lower substrate 120 to reflect the radiated light L1 and an absorbing layer 141b disposed on the reflection layer 141a to absorb the external light L2.

The reflection layer 141a and the absorbing layer 141b are provided as metal layers which include metal materials. The lower polarizing layer 140 and the upper polarizing layer 150 may conduct polarizing-filtering of light only with the wire grid structures. In response to the wire grid structures being provided as metal layers, polarizing-filtering properties are improved by plasmon resonance that occurs on a surface of a nanoscale metal by collective oscillation of free electrons.

The reflection layer 141a is disposed on a portion of the lower polarizing layer 140 that the radiated light L1 reaches first. That is, the reflection layer 141a is disposed on the upper surface of the lower substrate 120 so that the radiated light L1 reaches the reflection layer 141a before the absorbing layer 141b. The reflection layer 141a serves a polarized component of light that does not pass through the wire grid of the lower polarizing layer 140 but is filtered heading back to the backlight 50 (FIG. 2) in the −Z direction.

The reflection layer 141a includes metal materials with high light reflectance, such as Al or Al alloy materials.

The absorbing layer 141b is disposed on a portion of the lower polarizing layer 140 that the external light L2 reaches first. That is, the absorbing layer 141b is disposed on the reflection layer 141a so that the external light L2 reaches the absorbing layer 141b before reaching the reflection layer 141a. The absorbing layer 141b absorbs the external light L2 passing through the upper substrate 110, thereby preventing the external light L2 from being reflected in the display panel 100 to exit back out of the display panel 100. That is, the absorbing layer 141b prevents the external light L2 from being reflected again in the display panel 100.

The absorbing layer 141b includes metal materials with a high light absorption rate, such as MoW.

In response to the absorbing layer 141b being disposed on the lower substrate 120 and the reflection layer 141a is dis-posed on the absorbing layer 141b unlike the foregoing structure of exemplary embodiment, the radiated light L1 first reaches the absorbing layer 141b and the external light L2 first reaches the reflection layer 141a. Then, re-reflection of the radiated light L1 and absorption efficiency of the external light L2 are considerably reduced.

Thus, in the wire grid of the lower polarizing layer 140 of an exemplary embodiment, the reflection layer 141a is disposed in a direction in which the radiated light L1 enters the display panel 100, and the absorbing layer 141b is disposed in a direction in which the external light L2 enters the display panel 100. Accordingly, re-reflection of the radiated light L1 and absorption efficiency of the external light L2 may be improved.

Meanwhile, the aforementioned structure of the lower polarizing layer 140 may be also applied to the upper polarizing layer 150. The upper polarizing layer 150 includes a absorbing layer 151a to absorb the radiated light L1 and an reflection layer 151b to reflect the external light L2, and the absorbing layer 151a and the reflection layer 151b serve substantially the same functions as those of the lower polarizing layer 140.

The upper polarizing layer 150 or the lower polarizing layer 140 may further include a dielectric layer 151c. The dielectric layer 151c protects the metal layers 141a, 141b, 151a and 151b, and contributes to the generation of surface plasmon waves by surface plasmon resonance to enhance polarizing-filtering properties.

The bars 151 forming the upper polarizing layer 150 project in the −Z direction to the lower substrate 120 from a lower surface of the upper substrate 110. That is, the bars 141 forming the lower polarizing layer 140 and the bars 151 forming the upper polarizing layer 150 project from the lower substrate 120 and the upper substrate 110, respectively, to face each other.

Thus, in the upper polarizing layer 150, the absorbing layer 151a is disposed under the lower surface of the upper substrate 110 and the reflection layer 151b is disposed under the absorbing layer 151a. Here, the expression "under" is understood based on the structure shown in FIG. 5.

With this structure, the radiated light L1 passing through the liquid crystal layer 130 (see FIG. 3) reaches the reflection layer 151b before the absorbing layer 151a, while the external light L2 reaches the absorbing layer 151a before reaching the reflection layer 151b. Details regarding the reflection layer 151b reflecting the radiated light L1 and the absorbing layer 151a absorbing the external light L2 are substantially the same as described above with respect to the lower polarizing layer 140, and thus descriptions thereof are omitted herein.

Hereinafter, a method of forming the upper polarizing layer 150 will be described with reference to FIG. 6. A method of forming the lower polarizing layer 140 is equivalent to the method of forming the upper polarizing layer 150.

Figure 6:
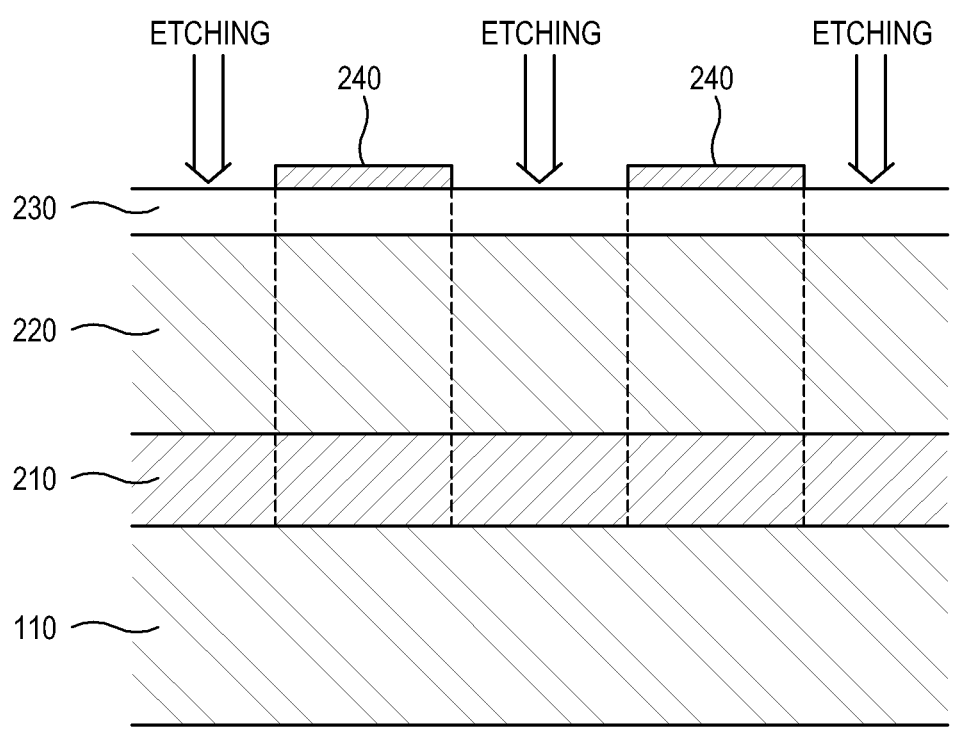
FIG. 6 illustrates a method of forming the upper polarizing layer on an upper substrate in the display panel of FIG. 3.

FIG. 6 illustrates the method of forming the upper polarizing layer 150 on the upper substrate 110.

As shown in FIG. 6, with the lower surface of the upper substrate placed up, a MoW layer 210, an Al layer 220 and a $SiO_2$ layer 230 are sequentially deposited on the lower surface of the upper substrate 110. The MoW layer 210, the Al layer 220 and the $SiO_2$ layer 230 respectively form the absorbing layer 151a, the reflection layer 151b and the dielectric layer 151c of FIG. 5.

In response to the dielectric layer 151c not being provided for the wire grid, the $SiO_2$ layer 230 is excluded. Further, the MoW layer 210 is deposited on the Al layer 220 for the lower polarizing layer 140, unlike the upper polarizing layer 150.

A photoresist 240 is deposited on the SiO₂ layer 230 based on the wire grid structure. The photoresist 240 may be deposited by lithography.

Subsequently, etching is carried out. The MoW layer 210, the Al layer 220 and the SiO₂ layer 230 are etched by etching excluding regions where the photoresist 240 is deposited. The photoresist 240 is removed, and accordingly the upper polarizing layer 150 with the wire grid structure is formed on the upper substrate 110.

The MoW layer 210 forming the absorbing layer 151*a* is more easily etched than the Al layer 220 forming the reflection layer 151*b*. That is, a wire grid structure including only the reflection layer 151*b* is easily etched as compared with a wire grid structure including the reflection layer 151*b* and the reflecting layer 151*b*. Thus, in forming a wire grid structure with an aspect ratio of 1:3, the structure including both the reflection layer 151*b* and the reflecting layer 151*b* is easier to manufacture than a structure which does not include the reflection layer 151*b*.

Hereinafter, a configuration of a display apparatus 900 according to a second exemplary embodiment will be described, with reference to FIG. 7.

Figure 7:
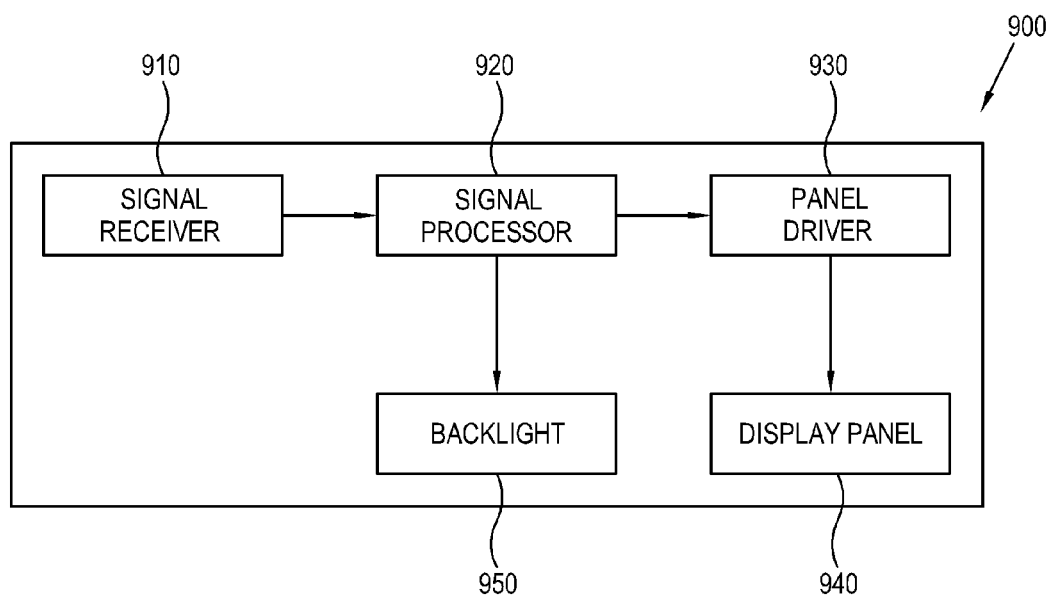
FIG. 7 is a block diagram which illustrates a configuration of a display apparatus according to a second exemplary embodiment.

FIG. 7 is a block diagram illustrating the configuration of the display apparatus 900 according to an exemplary embodiment.

As shown in FIG. 7, the display apparatus 900 includes a signal receiver 910 receiving an image signal, a signal processor 920 processing the image signal received by the signal receiver 910 according to a preset image processing process, a panel driver 930 outputting a driving signal which corresponds to the image signal processed by the signal processor 920, a display panel 940 which displays an image based on the image signal according to the driving signal from the panel driver 930, and a backlight 950 which provides light to the display panel 940 which corresponds to the image signal processed by the signal processor 920.

In an exemplary embodiment, the display apparatus 900 may be configured as various devices capable of displaying images; for example, a TV, a monitor, a portable media player and a mobile phone.

The signal receiver 910 receives an image signal or image data and transmits the image signal or image data to the signal processor 920. The signal receiver 910 may be configured as various types of receivers based on standards of received image signals and configurations of the display apparatus 900. For example, the signal receiver 910 may receive a radio frequency (RF) signal transmitted from a broadcast station (not shown) wirelessly or various image signals in accordance with composite video, component video, super video, SCART, high definition multimedia interface (HDMI), DisplayPort, unified display interface (UDI) or wireless HD standards, via a cable. In response to the image signal being a broadcast signal, the signal receiver 910 includes a tuner to tune the broadcast signal by each channel. Alternatively, the signal receiver 910 may receive an image data packet from a server (not shown) through a network.

The signal processor 920 performs various image processing processes on the image signal received by the signal receiver 910. The signal processor 920 outputs a processed image signal to the panel driver 930, so that an image based on the image signal is displayed on the display panel 940.

The signal processor 920 may perform any kind of image processing, without being limited to, for example, decoding which corresponds to an image format of image data, de-interlacing to convert interlaced image data into a progressive form, scaling to adjust image data to a preset resolution, noise reduction to improve image quality, detail enhancement, frame refresh rate conversion, or the like.

The signal processor 920 may be provided as an image processing board (not shown) formed by mounting an integrated multi-functional component, such as a system on chip (SOC), or separate components to independently conduct individual processes on a printed circuit board and be embedded in the display apparatus 900.

The panel driver 930, the display panel 940, and the backlight 950 have configurations substantially the same as those in the aforementioned exemplary embodiment, and thus detailed descriptions thereof are omitted herein.

Although a few exemplary embodiments have been shown and described, it will be appreciated by those skilled in the art that changes may be made in these exemplary embodiments without departing from the principles and spirit of the invention, the scope of which is defined in the appended claims and their equivalents.

What is claimed is:

1. A liquid crystal display (LCD) panel comprising:
   a lower substrate;
   an upper substrate disposed to face the lower substrate;
   a liquid crystal layer disposed between the upper substrate and the lower substrate;
   a lower polarizing layer with a structure of wire grid formed on one surface of the lower substrate and configured to provide polarizing-filtering of light radiated from a backlight; and
   an upper polarizing layer with a structure of wire grid formed on one surface of the upper substrate and configured to provide polarizing-filtering of the radiated light passing through the lower polarizing layer and the liquid crystal layer,
   wherein the wire grid of the lower polarizing layer comprises a reflection layer configured to reflect the radiated light and an absorbing layer configured to absorb external light incident from the outside through the upper substrate,
   wherein the reflection layer and the absorbing layer are stacked in sequence on the one surface of the lower substrate, and
   wherein the absorbing layer is configured to have a higher etching easiness than the reflection layer.

2. The LCD panel of claim 1, wherein in response to the radiated light entering a lower side of the lower substrate and the external light entering an upper side of the upper substrate, the absorbing layer is disposed on the reflection layer.

3. The LCD panel of claim 1, wherein the reflection layer is disposed in a direction in which the radiated light enters the display panel and the absorbing layer is disposed in a direction in which the external light enters the display panel in the wire grids of the lower polarizing layer.

4. The LCD panel of claim 1, wherein the reflection layer and the absorbing layer are metal layers comprising metal materials.

5. The LCD panel of claim 4, wherein the reflection layer is configured to have a higher light reflectance and a lower absorption rate than the absorbing layer.

6. The LCD panel of claim 4, wherein the reflection layer comprises an Al material.

7. The LCD panel of claim 4, wherein the absorbing layer comprises a MoW material.

8. A display apparatus comprising:
   a liquid crystal display (LCD) panel; and
   a backlight configured to provide light to the LCD panel to display an image on the LCD panel,
   the LCD panel comprising:

a lower substrate;

an upper substrate disposed to face the lower substrate;

a liquid crystal layer disposed between the upper substrate and the lower substrate;

a lower polarizing layer with a structure of wire grid formed on one surface of the lower substrate and configured to provide polarizing-filtering of light radiated from the backlight; and an upper polarizing layer with a structure of wire grid formed on one surface of the upper substrate and configured to provide polarizing-filtering of the radiated light passing through the lower polarizing layer and the liquid crystal layer, wherein the wire grid of the lower polarizing layer comprises a reflection layer configured to reflect the radiated light and an absorbing layer to absorb external light incident from the outside through the upper substrate, wherein the reflection layer and the absorbing layer are stacked in sequence on the one surface of the lower substrate, and wherein the absorbing layer is configured to have a higher etching easiness than the reflection layer.

9. The display apparatus of claim 8, wherein in response to the radiated light entering a lower side of the lower substrate and the external light entering an upper side of the upper substrate, the absorbing layer is disposed on the reflection layer.

10. The display apparatus of claim 8, wherein the reflection layer is disposed in a direction in which the radiated light enters the display panel and the absorbing layer is disposed in a direction in which the external light enters the display panel in the wire grids of the lower polarizing layer.

11. The display apparatus of claim 8, wherein the reflection layer and the absorbing layer are metal layers comprising metal materials.

12. The display apparatus of claim 11, wherein the reflection layer is configured to have a higher light reflectance and a lower absorption rate than the absorbing layer.

13. The display apparatus of claim 11, wherein the reflection layer comprises an Al material.

14. The display apparatus of claim 11, wherein the absorbing layer comprises a MoW material.

15. A liquid crystal display (LCD) panel comprising:

a liquid crystal layer;

a lower polarizing layer with a structure of wire grid formed on one surface of a lower substrate and configured to provide polarizing-filtering of light radiated from a backlight; and an upper polarizing layer with a structure of wire grid and configured to provide polarizing-filtering of the radiated light passing through the lower polarizing layer and the liquid crystal layer, wherein the wire grid of the lower polarizing layer comprises a reflection layer configured to reflect the radiated light and an absorbing layer configured to absorb external light incident from outside the LCD panel, wherein the reflection layer and the absorbing layer are stacked in sequence on the one surface of the lower substrate, and wherein the absorbing layer is configured to have a higher etching easiness than the reflection layer.

* * * * *